Sept. 20, 1932.  F. STOVALL  1,878,725
EXPANSIBLE PIPE HOLDER
Filed May 25, 1931   2 Sheets-Sheet 1

Inventor
Fred Stovall

Sept. 20, 1932.    F. STOVALL    1,878,725
EXPANSIBLE PIPE HOLDER
Filed May 25, 1931    2 Sheets-Sheet 2

Inventor
Fred Stovall
By Ashmead & Co.
Attorneys.

Patented Sept. 20, 1932

1,878,725

UNITED STATES PATENT OFFICE

FRED STOVALL, OF MONROE, LOUISIANA

EXPANSIBLE PIPE HOLDER

Application filed May 25, 1931. Serial No. 539,960.

This invention relates to a device for holding the ends of pipes in alinement while being joined by welding, one of the objects being to provide an expansible holder for insertion into the pipe ends and for expansion so as to press firmly upon the inner surfaces of the pipes.

A further object is to provide a holder of this character which will act as a dam to prevent flow of molten metal into the pipes during the welding operation.

Another object is to provide a holding tool which is simple, durable, and efficient and can be handled readily.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

Figure 1:
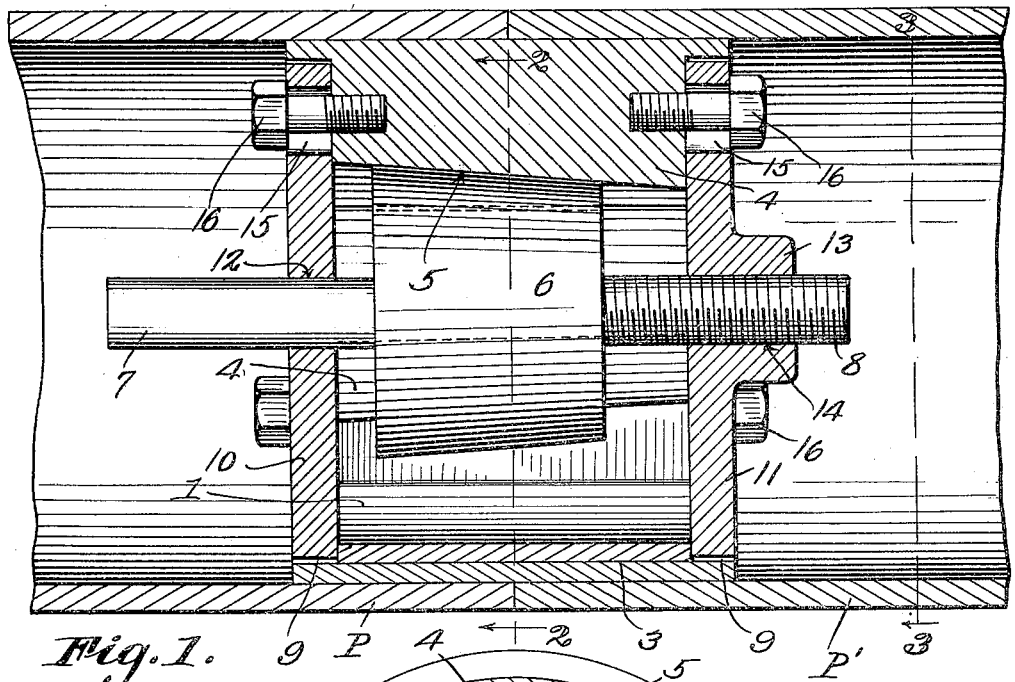
Figure 1 is a longitudinal section through portions of two pipes alined by the tool constituting the present invention.
Figure 2:
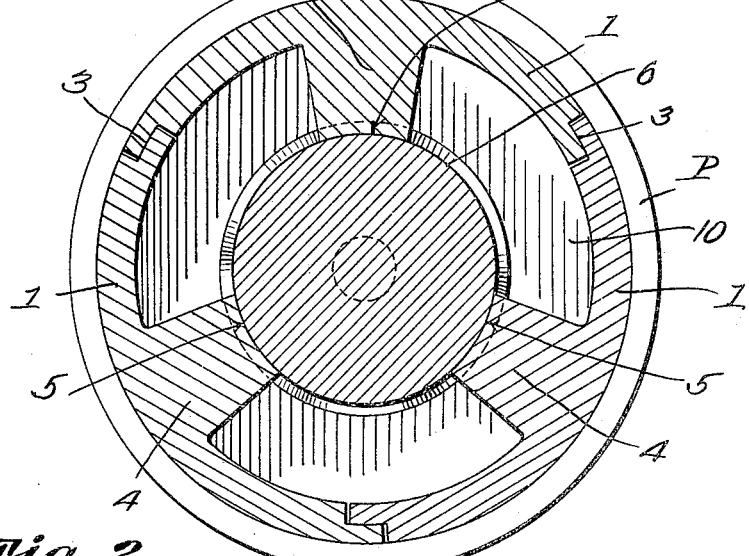
Figure 2 is a section on line 2—2, Figure 1.
Figure 3:
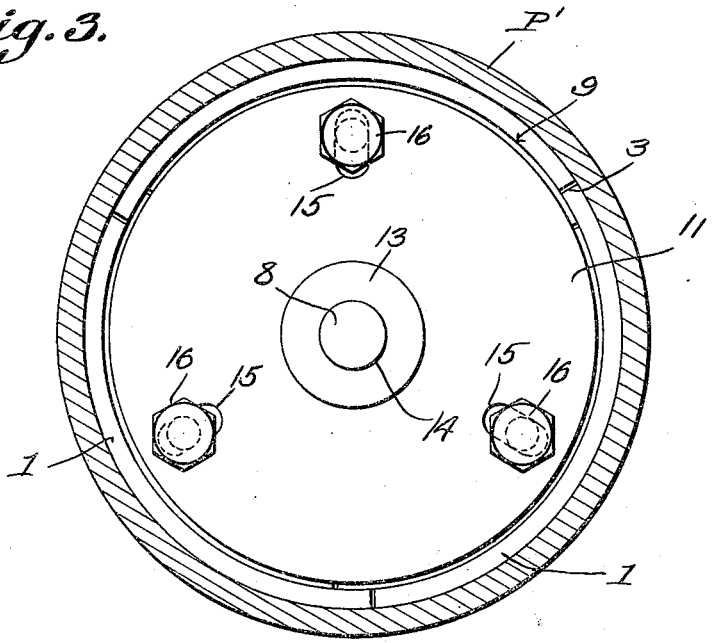
Figure 3 is a section on line 3—3, Figure 1.
Figure 4:
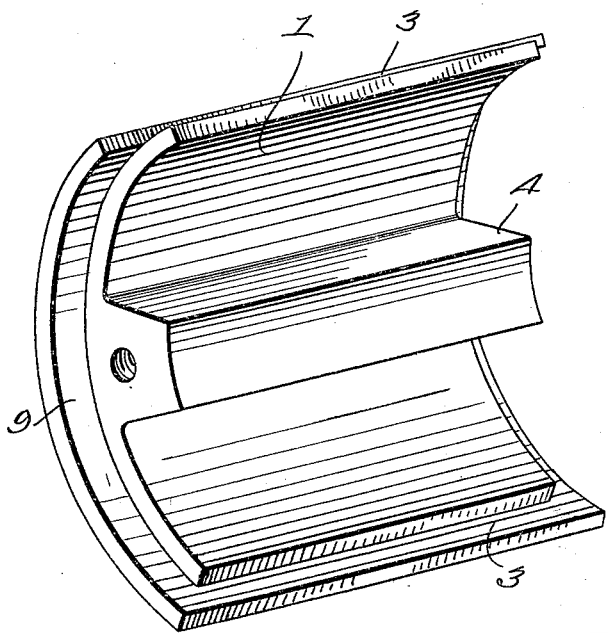
Figure 4 is a perspective view of one of the jaws of the tool.

Referring to the figures by characters of reference, 1 designates arcuate jaws which, when assembled side to side, define a cylindrical structure for insertion into the meeting end portions of pipes P and P' to be joined. The side edges of the jaws are rabbeted as shown at 3 so as to form lap joints when the jaws are assembled.

Formed along the center of the inner or concave face of each jaw is a rib 4 and the inner faces 5 of these ribs are transversely concaved and inclined longitudinally so as to fit snugly upon the surface of a conical core or spreader 6. Stems 7 and 8 extend from the ends of the spreader 6, and are coaxial therewith, one stem, 8, being screw-threaded as shown.

The ends of jaws 1 are recessed as at 9 to provide seats for heads 10 and 11 which are preferably circular. Head 10 has a central opening 12 in which stem 7 is supported and mounted to slide. Head 11 has a central boss 13 in which is an opening 14 threaded for engagement by stem 8.

Short radial slots 15 are formed in heads 10 and 11 and receive guide screws 16 which extend from the ends of ribs 4.

In practice the conical spreader 6 is rotated so as to be set back from head 11 thereby to allow the jaws 1 to collapse toward the center of the tool. Said tool is then placed in the meeting end portions of pipes P and P' and the spreader is fed longitudinally to expand the holder and press the jaws 1 tightly against the inner faces of the pipes. The pipes are thereafter welded in the usual manner and the jaws will act as a means for preventing molten metal from flowing into the pipes.

It is to be understood that the means for adjusting the conical spreader longitudinally can be varied within the scope of the present invention and force can be applied to the stem or stems in any suitable manner for the purpose of rotating the same.

What is claimed is:

1. A pipe holder including spaced heads, an annular series of arcuate jaws between the heads and supported thereby for unrestrained relative radial movement, inclined ribs converging inwardly from the centers of the jaws and providing segmental spaces between the ribs, said ribs having relatively narrow faces, a longitudinally adjustable spreading core between the ribs and frictionally engaging said faces, oppositely extending axial stems on the core engaging the heads for rotation and longitudinal movement and for supporting the spreader, one of the stems being in screw-threaded engagement with one of the heads to feed the core longitudinally along the bearing faces to expand or collapse the holder, the meeting edges of the jaws being rabbeted and in lapped relation, thereby to maintain a substantially tight connection between the jaws when in all working positions.

2. A tool for holding the meeting ends of pipes in alinement while being welded, inclined spaced heads having radial slots, arcuate jaws lapping the peripheries of the heads and normally concentric therewith, radial ribs converging from the centers of the jaws and between the heads, said ribs having inclined, relatively narrow bearing jaws, the ends of the ribs constituting abutments for the heads, means extending from the ends of the ribs and slidable in the slots in the heads for holding the jaws and heads assembled, said jaws and ribs being mounted for unrestrained independent radial movement relative to the heads, a frusto-conical spreader between the heads and slidably and rotatably engaging the bearing faces of the ribs, oppositely extending axial stems projecting from the spreader and movable longitudinally and rotatably within the respective heads, one of said stems being in screw-threaded engagement with one of the heads, the jaws having rabbeted longitudinal edges lapping to close the spaces between the jaws at all times while the jaws are in different working positions, there being segmental spaces between the ribs and the heads, said spreader being rotatable to feed the stems longitudinally to shift the ribs and jaws radially relative to the heads.

In testimony that I claim the foregoing as my own, I have hereto affixed my signature.

FRED STOVALL.